United States Patent [19]

Cohen et al.

[11] Patent Number: 4,496,261

[45] Date of Patent: Jan. 29, 1985

[54] COLUMN/SHEET METAL INTERFACE

[75] Inventors: Samuel Cohen, Massapequa Pk.; Edward F. Wisser, Port Jeff Sta., both of N.Y.

[73] Assignee: Hazeltine Corporation, Commack, N.Y.

[21] Appl. No.: 272,847

[22] Filed: Jun. 12, 1981

[51] Int. Cl.³ .............................................. F16B 39/00
[52] U.S. Cl. .................................. 403/320; 403/388; 403/408; 411/368
[58] Field of Search ............... 403/364, 388, 408, 320; 24/221 R, 221 A; 411/368, 366, 533; 285/19, 330, 191, 194, 203

[56] References Cited

U.S. PATENT DOCUMENTS

| | | | |
|---|---|---|---|
| 1,036,932 | 8/1912 | Thompson | 182/228 X |
| 2,317,070 | 4/1943 | Tourneau | 182/228 X |
| 3,016,248 | 1/1962 | Lindberg | 411/368 X |
| 3,283,402 | 11/1966 | Larson | 182/228 X |
| 3,491,630 | 1/1970 | Mielke | 411/368 X |
| 4,252,313 | 2/1981 | Skalka | 182/228 X |

FOREIGN PATENT DOCUMENTS

| | | | |
|---|---|---|---|
| 1204129 | 8/1959 | France | 182/228 |
| 856845 | 12/1960 | United Kingdom | 182/228 |
| 1092466 | 11/1967 | United Kingdom | 182/228 |

Primary Examiner—Dave W. Arola
Attorney, Agent, or Firm—E. A. Onders; F. R. Agovino

[57] ABSTRACT

Sheet metal having an opening therein includes projections adjacent to the opening. A column to be mounted at the opening has a slot therein for engaging the projections. The column has a threaded axial opening which is engaged by a screw located within the opening of the sheet metal. The opening may have a tapered portion with the projections located thereon.

A tool for shaping the sheet metal with an opening therein is also disclosed. The tool includes a member having a first end to which a force may be applied and a second end with at least one radial projection. A seat is provided for receiving the second end of the member. The sheet metal is shaped by placing the opening over the seat, locating the second end of the member within the opening and sheet and applying a force to the first end of the member.

8 Claims, 12 Drawing Figures

COLUMN/SHEET METAL INTERFACE

The Government has rights in this invention pursuant to Contract No. N0019-77-C-0411 awarded by the Department of the Navy.

BACKGROUND OF THE INVENTION

1. Field of the Invention

The invention relates generally to column/sheet metal interfaces and, in particular, to column/sheet metal structure which facilitates nonrotational mounting of the column to the sheet metal.

2. Description of the Prior Art

When a column is mounted to a planar surface such as a housing formed from sheet metal, it is frequently necessary to provide a fixed engagement between the column and the sheet metal so that the column does not rotate with respect to the sheet metal. This allows a screw to engage the column and permits tightening of the screw from the exterior of the housing without the need for holding the column to prevent rotation. When the housing is especially thin, such as 0.02 inches of aluminum alloy, the prior art suggests electron beam welding of the column to the housing or dip brazing of the column to the housing to prevent such rotation. Such prior art interfaces are costly.

SUMMARY OF THE INVENTION

It is an object of this invention to provide a means for interfacing a column and a sheet metal surface so that the column does not rotate with respect to the surface.

The interface according to the invention comprises a planar member having an opening and at least one projection located adjacent to the opening. The longitudinal member to be mounted to the planar member has an indentation which engages the projection. Means are provided for interconnecting the longitudinal member and the planar member. The means for interconnecting may be a screw for engaging a threaded axial opening in the longitudinal member and the opening in the planar member may have a tapered portion including the projection.

A tool for shaping a planar member having an opening therein is also disclosed. The tool includes a longitudinal member having a first end to which a force may be applied and a second end with at least one radial projection. A seat for receiving the second end of the longitudinal member has an opening for receiving the second end and at least one indentation adjacent said opening for receiving the projection. The planar member is shaped by placing it over the seat so that the opening in the planar member is aligned with the opening in the seat. The second end of the longitudinal member is located in the aligned openings and a force is applied to the first end of the longitudinal member.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
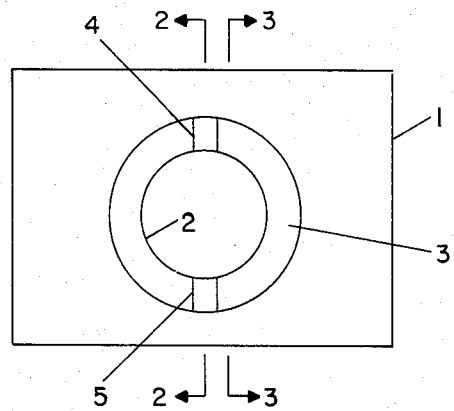
FIG. 1 is a top view of sheet metal formed in accordance with the invention.
Figures 2, 3:
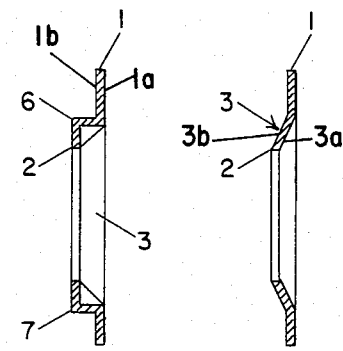
FIGS. 2 and 3 are sectional views taken along lines 2—2 and 3—3, respectively, of FIG. 1.
Figure 4:
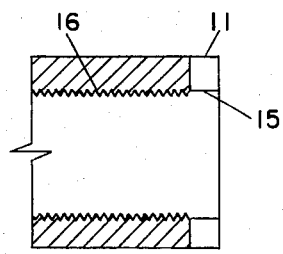
FIG. 4 is a partial, longitudinal sectional view of a column according to the invention.
Figure 5:
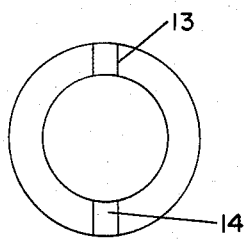
FIG. 5 is an end view of a column according to the invention.
Figure 6:
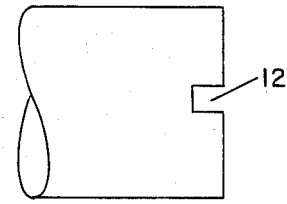
FIG. 6 is a side view of a portion of a column according to the invention.

The invention relates to the interface between a planar member, such as sheet metal piece 1 illustrated in FIGS. 1 thru 3 and a longitudinal member such as column 11 illustrated in FIGS. 4 thru 6. Sheet metal 1 has an outer side 1a and an inner side 1b and is provided with an opening 2 which may be defined by a tapered portion 3 having a corresponding outer side 3a and a corresponding inner side 3b. Adjacent the opening 2 are opposing indentations 4 and 5 which protrude from sheet metal 1 and form projections 6 and 7.

Column 11 for engaging sheet metal 1 is provided with an indentation 12 defined by notches 13 and 14. An axial opening 15 may be provided in column 11 and may include threads 16 for engaging a screw.

Figure 7:
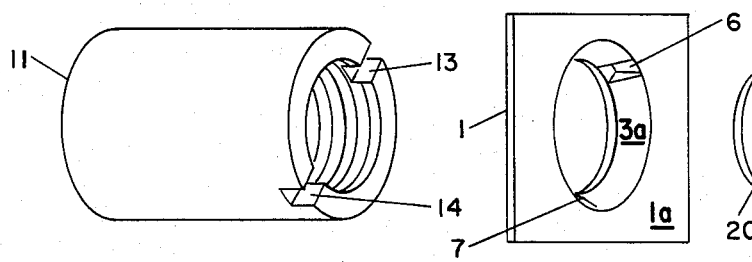
FIG. 7 is an oblique, composite view of a column, sheet metal and a screw illustrating the engagement thereof according to the invention.

In order to secure column 11 to sheet metal 1 and prevent rotation therebetween, projections 6 and 7 engage notches 13 and 14 and sheet metal 1 is fixed to column 13 by means of screw 20 as illustrated in composite by FIG. 7.

Figure 11:
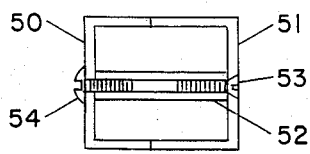
FIG. 11 is a sectional view of a housing illustrating a column connecting the portions of the housing.
Figure 12:
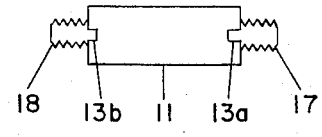
FIG. 12 is a side view of an alternative embodiment of a column according to the invention.

The invention is particularly useful in the assembly of sheet metal housings. For example, as illustrated in FIG. 11, rectanguloid portions 50 and 51 form a housing which is joined by column 52. Screw 53 secures column 52 to rectanguloid portion 51. To assemble the rectanguloid portions 50 and 51, portion 50 is located adjacent portion 51 and screw 54 engages column 52. In order to prevent rotation between column 52 and portion 50, thereby preventing the proper tightening of screw 54, column 52 must engage portion 50 or portion 51. The invention may be used in such an engagement. Furthermore, in the event of failure of the column thread, the column can easily be replaced without damaging the housing. Alternatively, column 11 may terminate in threaded shafts 17 and 18 as illustrated in FIG. 12. The shafts 17 and 18 project through the sheet metal for engagement with nuts and are provided with notches 13a and/or 13b which engage projections in the sheet metal.

Figure 8:
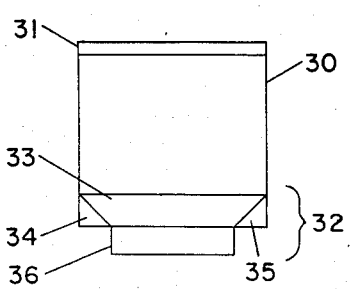
FIGS. 8 and 9 are side and end views, respectively, of a tool for forming the sheet metal in accordance with the invention.
Figure 9:
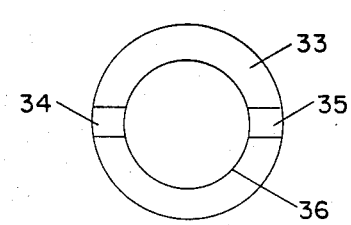
Figure 10:
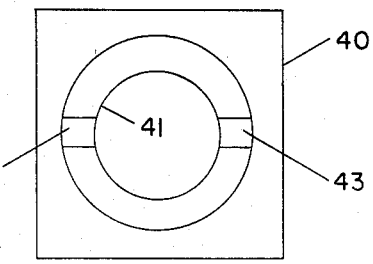
FIG. 10 is a top view of a seat for use in combination with the tool illustrated in FIGS. 8 and 9.

FIGS. 8 thru 10 illustrate a tool for forming a sheet metal piece 1 according to the invention. Cylindrical member 30, of hardened steel or the like, is provided with an impact end 31 and a forming end 32. The forming end 32 may have a tapered portion 33 and opposing projections 34 and 35 which terminate in a narrow portion 36. Seat 40 is provided with an opening 41 having the same diameter as narrow portion 36 and indentations 43 and 44 corresponding to projections 34 and 35.

Tapered portion 42 of seat 40 corresponds to the tapered portion 33 of cylindrical member 30.

In operation, sheet metal 1 is placed over seat 40 so that opening 2 is in registry with opening 41. Narrow portion 36 is placed within opening 41 and an impacting force, such as the strike of a hammer, is applied to end 31. The force causes projections 34 and 35 to shape indentations 4 and 5 within sheet metal 1. The force also causes tapered portion 33 to force the peripheral portion of opening 2 of sheet metal 1 toward tapered portion 42 of seat 40 thereby forming tapered portion 3.

The interface according to the invention may include only one projection for engaging an indentation in a column. However, the invention has been described in terms of a pair of opposing projections, which is considered to be a preferred embodiment.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus comprising:
  (a) a housing having opposing first and second portions,
    said first portion including a first planar member with an inner side and an outer side,
    said first portion having a first opening therein defined by an inwardly projecting tapered portion,
    said inwardly projecting tapered portion having an inner surface corresponding to the inner side of the first planar member and an outer surface corresponding to the outer side of the first planar member,
    said inwardly projecting tapered portion having a first inwardly projecting porjection adjacent said first opening, and
    said second portion including a second planar member having a second opening therein;
  (b) a longitudinal member having first and second ends located within said housing and spanning between said first and second openings, the first end of said longitudinal member for engaging the inner surface of the inwardly projecting tapered portion, the first end having a first indentation therein for engaging said first projection;
  (c) first means interconnecting the first end of said longitudinal member and said first portion via said first opening whereby said first end engages the inner surface and said first indentation engages said first projection; and
  (d) second means interconnecting the second end of said longitudinal member and said second portion via said second opening.

2. The apparatus of claim 1 wherein said longitudinal member has a threaded axial opening therein, and wherein said first means comprises a screw located within the opening in said planar member and engaging said threaded axial opening.

3. The apparatus of claim 2 wherein said second planar member has a second projection adjacent said second opening; and wherein the second end of said longitudinal member has a second indentation therein for engaging said second projection whereby said second indentation engages said second projection.

4. The apparatus of claim 3 wherein said longitudinal member has a threaded axial opening therein, and wherein said second means comprises a screw located within the opening in said planar member and engaging said threaded axial opening.

5. The apparatus of claim 4 wherein the area adjacent the second opening in said planar member comprises a substantially flat sheet having an opening defined by a tapered portion projecting from said sheet, said tapered portion having projections projecting therefrom.

6. The apparatus of claim 1 wherein the first end of said longitudinal member has a first threaded shaft located within the first opening and wherein said first means comprises a first nut engaging said first threaded shaft.

7. The apparatus of claim 6 wherein said second planar member has a second projection adjacent said second opening; and wherein the second end of said longitudinal member has a second indentation therein for engaging said second projection whereby said second indentation engages said second projection.

8. The apparatus of claim 7 wherein the second end of said longitudinal member has a second threaded shaft located within the second opening and wherein said second means comprises a second nut engaging said second threaded shaft.

* * * * *